Jan. 14, 1930.                L. W. LANGFORD                1,743,277
                            SALES RECORD MACHINE
                       Filed Sept. 17, 1927    5 Sheets-Sheet 1
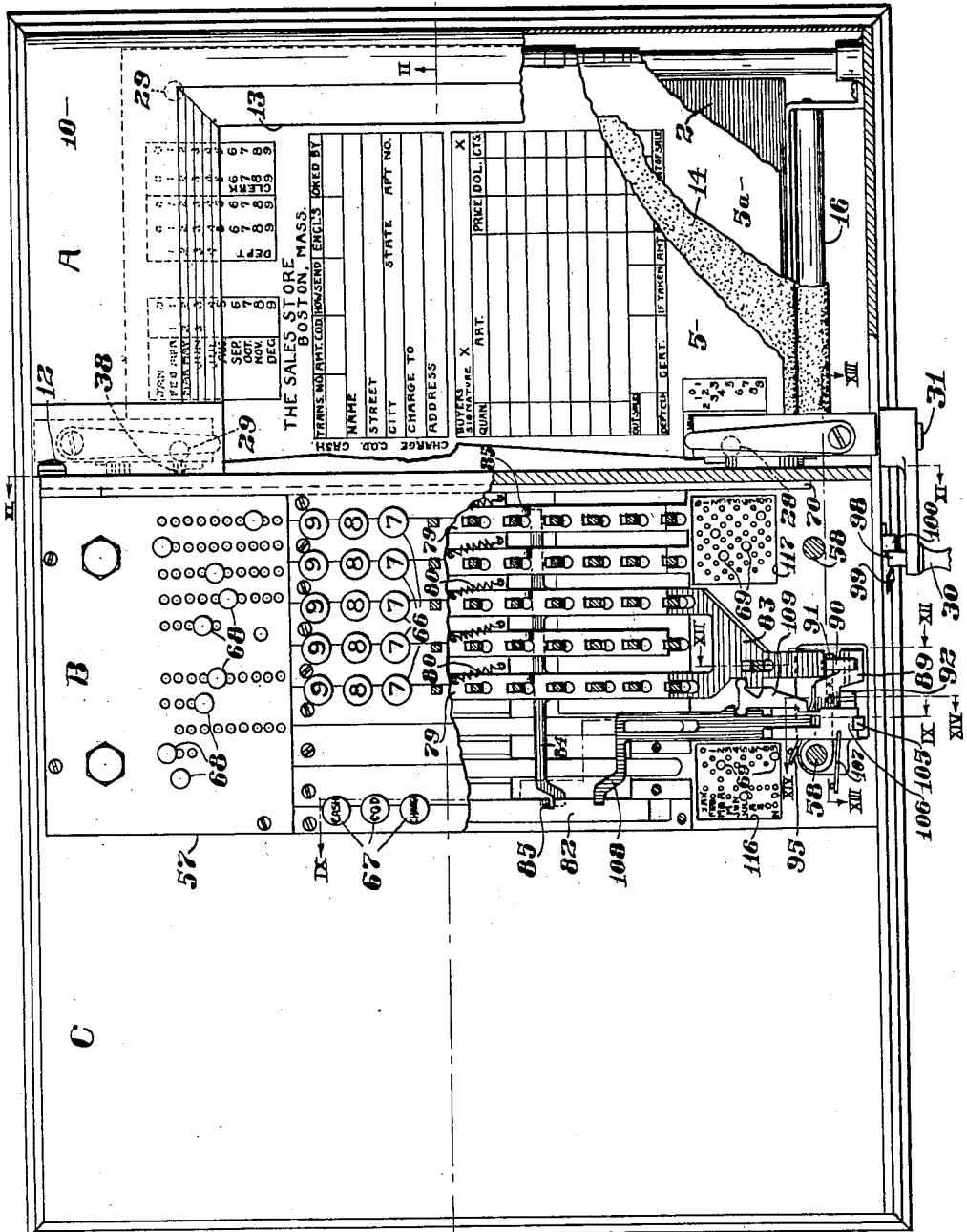
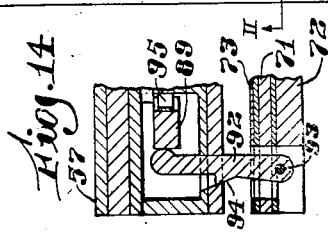
Inventor
Leonard W. Langford
by
Attorney

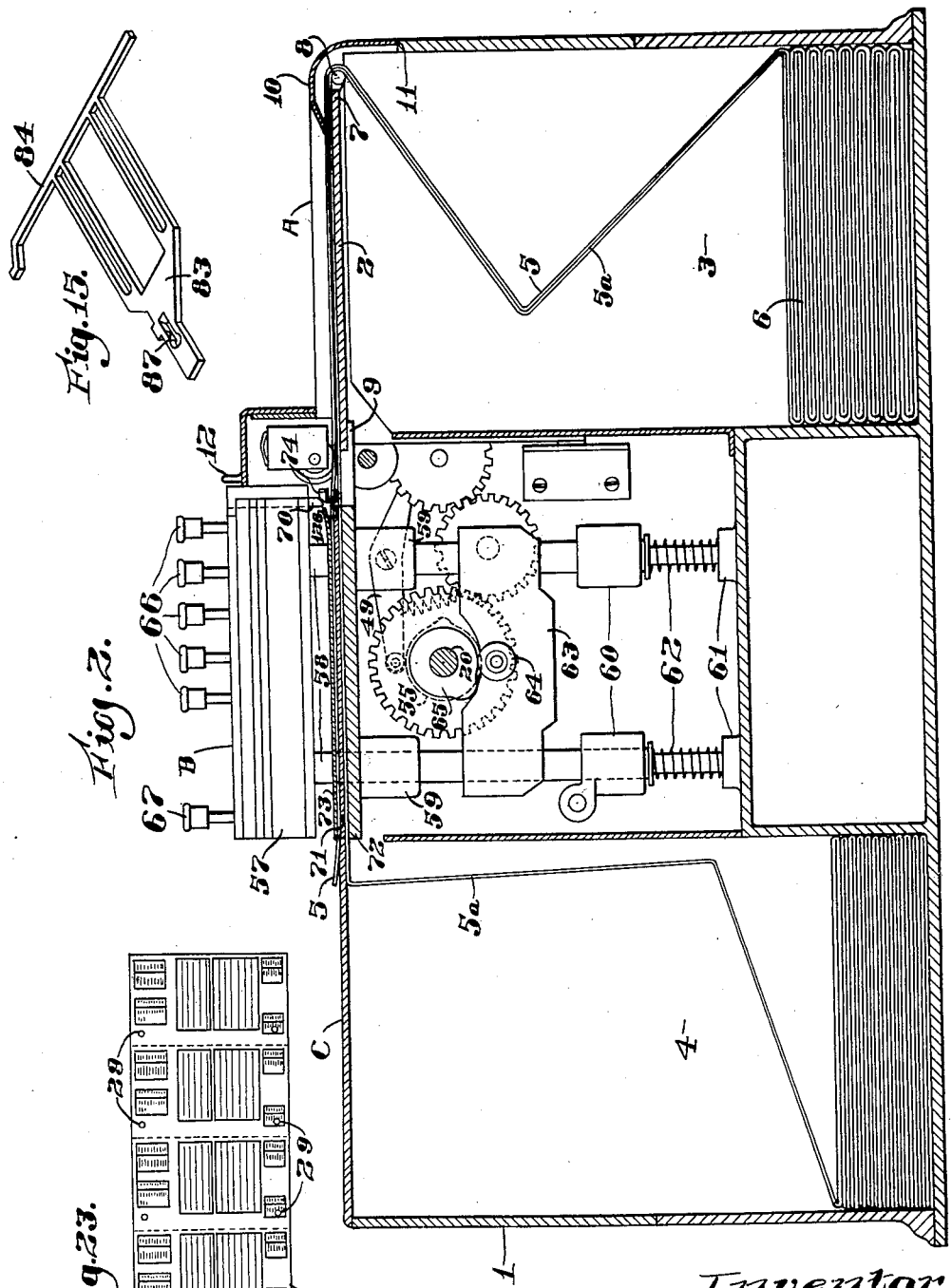

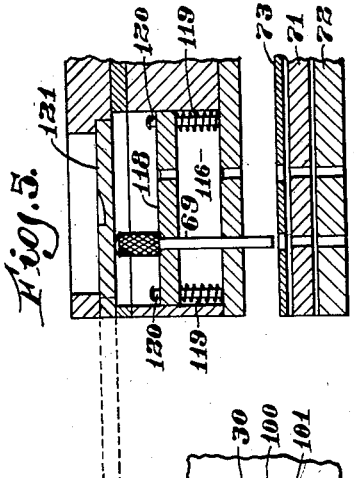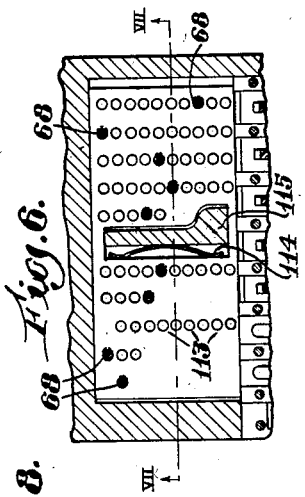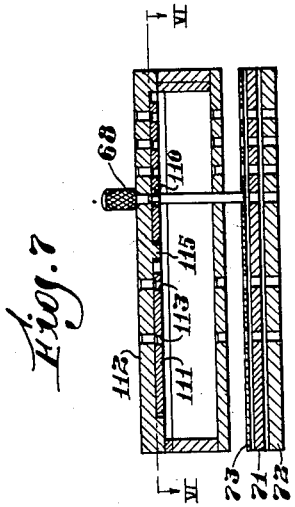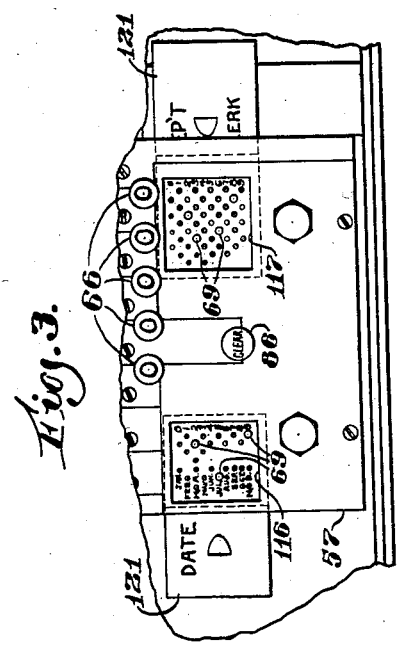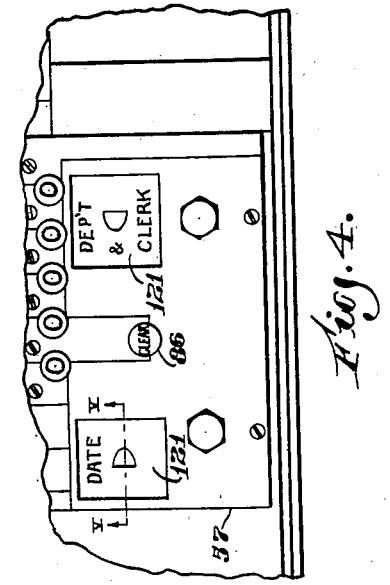

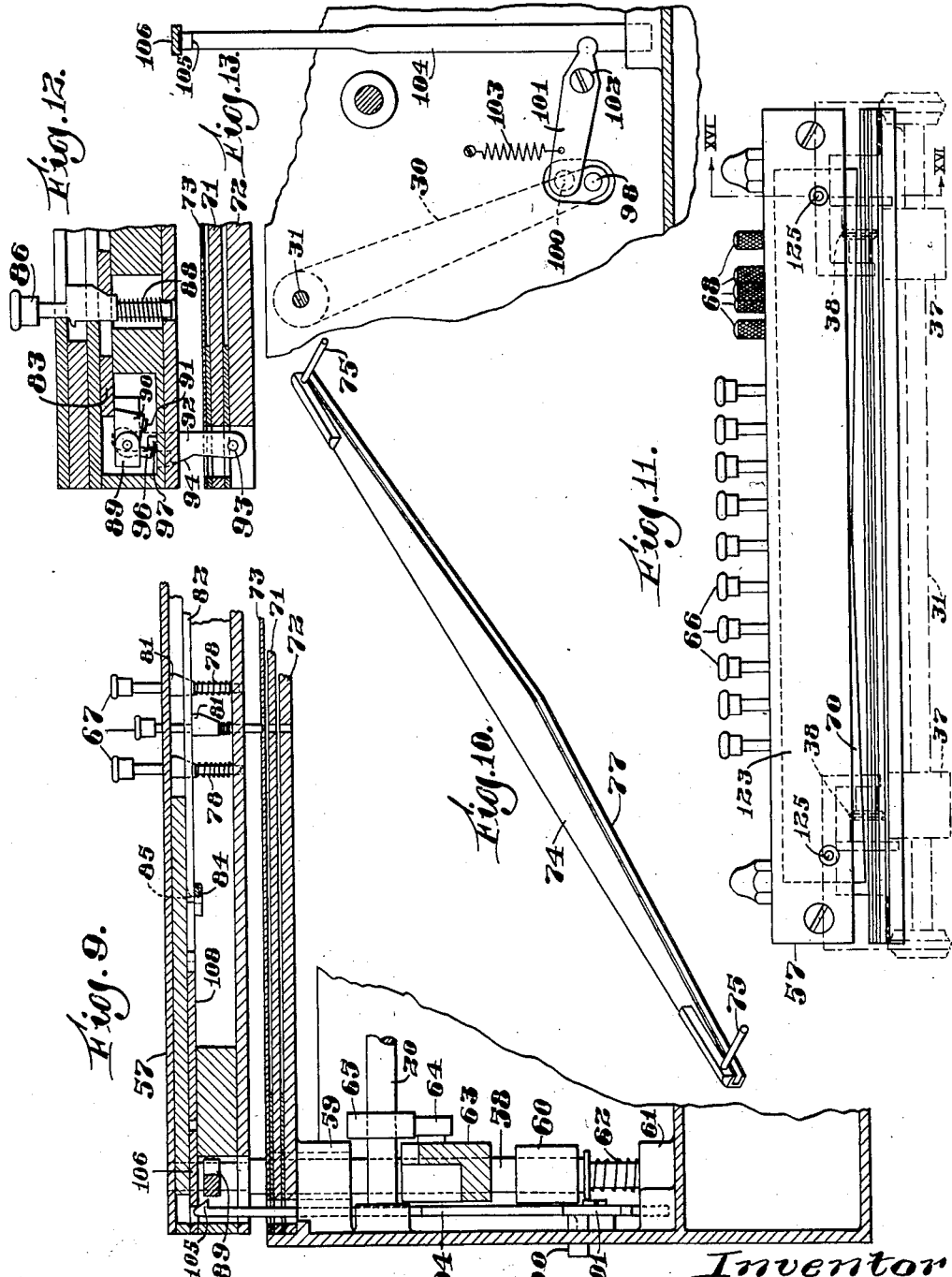

Jan. 14, 1930.  L. W. LANGFORD  1,743,277
SALES RECORD MACHINE
Filed Sept. 17, 1927   5 Sheets-Sheet 5
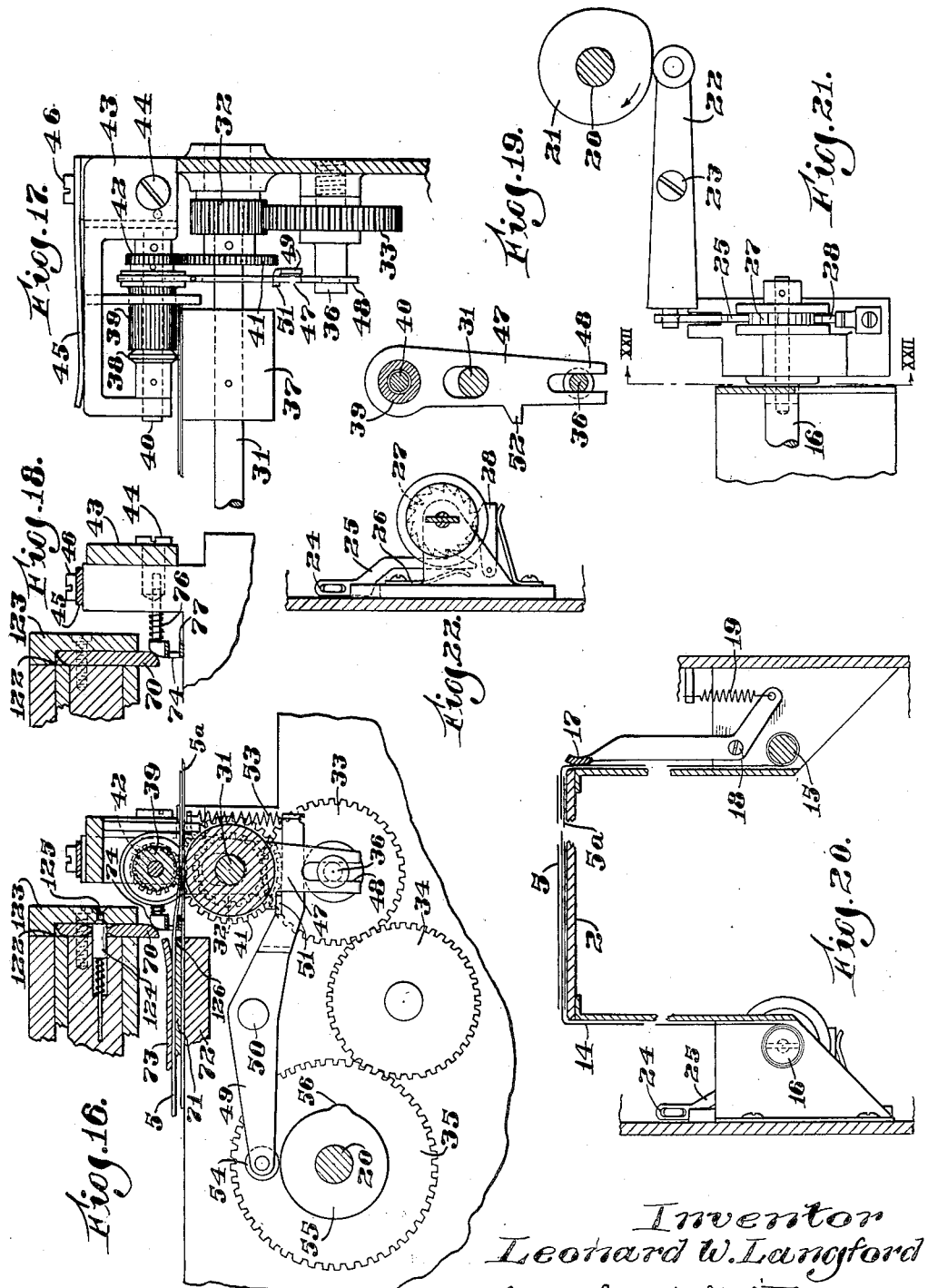
Inventor
Leonard W. Langford
by [signature]
Attorney Patented Jan. 14, 1930

1,743,277

UNITED STATES PATENT OFFICE

LEONARD W. LANGFORD, OF HANOVER, MASSACHUSETTS, ASSIGNOR TO LANGFORD SALES AUDIT MACHINE COMPANY, A CORPORATION OF MASSACHUSETTS

SALES-RECORD MACHINE

Application filed September 17, 1927. Serial No. 220,243.

This invention relates to a sales record machine in which a clerk when making a sale can make an autographic-punched record thereof. Sales record machines of a similar nature are shown in Patent No. 1,669,804 of H. E. Baker, dated May 15, 1928, and my Patent No. 1,669,766, dated May 15, 1928, and the primary object of the invention herein is to provide a machine having various improvements over these former machines.

It is well known that a considerable amount of tabulating and accounting work is done automatically today through the agency of punched records. In order to speed up the work of accounting, eliminate errors and cut down the great expense entailed in present methods of sales recording and accounting in department stores, some of the largest stores have adopted the method of making punched record cards from the well known sales slips. These cards are made on punching machines in the main office by a corps of punch operators. Ordinarily the punch operators make these punched record cards from the sales slips of the previous day's sales on the day following the sales transactions. The punched cards are thereafter sorted in accordance with the character of the transactions, such as "cash", "C. O. D.", and "charge" sales; in accordance with departments, etc. The sorted groups of cards are then run through a tabulating machine which records and totals the transactions. It will be obvious that such a method involves considerable labor, many chances for errors, and great delay and inconvenience in obtaining the final results.

My invention herein provides a combined autographic and punching sales recording device, wherein an autographic record and a punched record are made by the sales clerk in one and the same transaction at the time of making the sale and on the same sales ticket. The machine comprises a writing platen and a cooperating punch press adjacent thereto, both adapted to conveniently receive the sales slip to be marked and punched. Preferably these slips are connected in strip form and means is provided for progressively moving the strips through the machine. The punching and feeding mechanisms are operated from a single handle and they comprise various novel features of construction and operation which render the machine most convenient and efficient. The machine also embodies a knife for shearing certain of the punched tickets from the strips, the knife also being preferably operated from the said handle. The provision of a machine embodying these features is one of the objects of my invention.

A machine of this type is ordinarily provided with a plurality of manifolded ticket strips to make an original and one or more carbon copies and it is desirable for various reasons to punch and shear only certain of these manifolded strips. It is another object of my invention to provide a mechanism for performing this function and also a cooperating means for feeding the strips thereto for this purpose.

A further object of my invention resides in providing an interlocking means for preventing the strip feeding and punching operations until certain required data has been set up on the punch press, and other means for automatically restoring the set-up punching mechanism to normal after each punching operation.

Other objects and the details of the invention will appear as this description proceeds. In the accompanying drawings I have illustrated certain specific embodiments of my invention but it will be understood that the invention can be otherwise embodied and that the drawings are not to be construed as defining or limiting the scope of the invention, the claims appended hereto being relied upon for that purpose.

Referring to the figures of the drawings:

Fig. 1 is a plan view, partly broken away, of a machine embodying my invention.

Fig. 2 is a sectional view on the line II—II of Fig. 1.

Fig. 3 is a fragmentary plan view of one end of the punch press showing the punch covers slid to the open position.

Fig. 4 is a like view showing the covers closed.

Fig. 5 is an enlarged fragmentary sectional view taken on line V—V of Fig. 4.

Fig. 6 is a fragmentary plan view of the upper end of the punch press shown in Fig. 1, this view being taken on line VI—VI of Fig. 7.

Fig. 7 is a sectional view taken on line VII—VII of Fig. 6.

Fig. 8 is a fragmentary front view of the machine showing the handle locking mechanism.

Fig. 9 is a fragmentary sectional view taken on line IX—IX of Fig. 1.

Fig. 10 is a perspective view of the strip separator.

Fig. 11 is a sectional view taken on line XI—XI of Fig. 1.

Fig. 12 is a fragmentary sectional view taken on line XII—XII of Fig. 1.

Fig. 13 is a fragmentary sectional view taken on line XIII—XIII of Fig. 1.

Fig. 14 is a fragmentary sectional view taken on line XIV—XIV of Fig. 1.

Fig. 15 is a perspective view of a punch releasing plate.

Fig. 16 is a fragmentary sectional view taken approximately on line XVI—XVI of Fig. 11.

Fig. 17 is a front elevation of the feeding mechanism shown in Fig. 16.

Fig. 18 is a detail sectional view showing how the strip separator is supported.

Fig. 19 is a detail view of a plate shown in Figs. 16 and 17.

Fig. 20 is a fragmentary view showing the carbon mounting and feeding mechanism.

Fig. 21 is a view of the carbon feeding mechanism.

Fig. 22 is a sectional view taken on line XXII—XXII of Fig. 21.

Fig. 23 illustrates one of the ticket strips.

The machine illustrated herein, as embodying my present invention, comprises a body 1 which may be considered as having three main sections as follows: end section A comprising a writing platen 2 and a sales slip supply compartment 3 therebeneath; middle section B comprising the punching mechanism; and end section C comprising a record receiving compartment 4.

The sales slips or tickets 5 are preferably in strip form and the desired number of manifold copies thereof are fan-folded together as illustrated to form a supply pack 6. The bottom pack 5ª, which is retained in the locked compartment 4 and afterwards used to automatically audit the sales, is of heavier material than the other copy or copies, it being understood that more than the two illustrated copies can be provided if desired.

One edge of the writing platen 7 is pivotally supported on the guide roll 8 and its other edge rests on a ledge 9 of the punch press. The cover 10 for the tickets is hinged at 11 and normally held down by spring latches 12. The central portion of cover 10 is provided with an opening 13 exposing the ticket for writing the sale thereon as illustrated in Fig. 1. Access to the chamber 3 is had by releasing the latches 12 and pivoting the cover 10 upwardly, and by lifting the plate 7 upwardly above its pivot 8.

A carbon strip 14, having its ends supported by spools 15 and 16, extends over the platen between the strips 5. Directly above the supply spool 15 is a pressure foot 17 for frictionally engaging the carbon strip. This foot comprises a lever pivoted at 18 and having a spring 19 normally holding the foot engaged against the carbon strip. The carbon strip is given a slight feeding movement at each punching operation as follows (Fig. 19): At each rotation of a shaft 20 a cam 21 thereon depresses a roller on one end of a lever 22 pivoted at 23. The other end of this lever engages in an eye 24 in a ratchet finger 25. A spring 26 normally holds a tooth on this finger in engagement with a ratchet wheel 27 on the spool 16. A pivoted spring pressed tooth 28 prevents backward rotation of the spool. It is obvious that the carbon strip will thereby be given a slight feeding movement at each rotation of the shaft 20.

As illustrated particularly in Fig. 23, each ticket strip comprises a plurality of individual tickets through each of which is a pair of holes. These holes are for the purpose of controlling the accurate feeding and locating of the tickets. As illustrated in Fig. 2, the ticket strips pass from the platen 7 through the punching mechanism. My novel mechanism for feeding the strips therealong will now be described.

The machine is operated by a handle 30 on a shaft 31. This shaft is connected to the main punch shaft 20 by gears 32, 33, 34 and 35, the gear 33 being mounted on a stub shaft 36 carried by the casing of the machine. A feeding mechanism, shown in Fig. 17, is provided at each side of the machine to engage each of the two edges of the strips.

Each of these feeding mechanisms comprises a feed roller 37 on the shaft 31 with which cooperates a narrow roller 38 and a wide roller 39 both on a shaft 40 driven from shaft 31 by gears 41 and 42. The shaft 40 is carried in a block 43 secured to the casing by a screw 44. A spring 45 held by a screw 46 engages the block 43 and normally holds the roller 38 in contact with the roller 37. The block and roller 38 can be slightly raised by swinging the spring 45 to one side.

The roller 39 has a loose fit on the shaft 40 whereby this roller can be held in a position gripping the strips between itself and the roller 37 or in a position away from such strips. The upper end of a plate 47 engages one end of the roller 39 and the lower forked end 48 of this plate is slidably supported by the shaft 36. Obviously when the plate is held down the roller 39 presses against the roller 37 and when the plate is held up the roller 39 is raised from the roller 37.

A lever 49 pivoted at 50 has an offset 51 engaging beneath a shoulder 52 of the plate 47, and a spring 53 connected to one end of the lever normally holds this end of the lever and the plate in the raised position. A roller 54 on the other end of the lever rides on a cam 55 on the shaft 20, the cam having a short raised portion 56.

The relatively narrow roller 38 of each feeding mechanism is in alignment with its row of holes 29 in the ticket strips and it is obvious that rotation of the handle 30 will operate to feed the strips through engagement of the rollers 37 and 39 whenever the strips are gripped therebetween. However, when a roller 38 enters a hole 29 such roller 38 directly engages the roller 37 and, there being no gripping of the strips therebetween, the feeding movement of the strips stops, even though the rollers continue to rotate. The feed of the strips is thereafter again automatically started at the proper time by means of the cam portions 56 operating through levers 49 to draw the wide rollers 39 into gripping engagement with the strips against the roller 37. The operation of this mechanism will be understood from a description of the general operation of the machine given hereinafter.

The punch press comprises a punch carrying head 57 suported on two pairs of vertical studs 58 extending downwardly through bearings 59, 60 and 61. Springs 62 normally hold the head in raised position. The two studs of each pair are connected by a cross piece 63 extending beneath the shaft 20 and provided with anti-friction rollers 64 adapted to be engaged by cams 65 on the shaft. In this manner the head is depressed at each rotation of the main shaft 20.

The head 57 carries the following sets of elements, all of which are hereinafter specifically described:

1. Five rows of settable punches 66 for punching the amount of the transaction recorded, each row having ten punches therein marked respectively from 0 to 9. A similar row of three settable punches 67 is provided for punching the class of transaction, namely: cash, C. O. D. and charge.

2. A plurality of semi-permanent but adjustable punches 68 at the top end of the head for punching the date, Dept. No. and clerk No.

3. A similar set of punches 69 at the bottom end of the head for punching the same data.

4. A knife 70 for shearing the top ticket or tickets from the strips.

The punch head and its elements operate in conjunction with upper and lower die plates 71 and 72. The purpose of two die plates is to provide for making certain punchings in and shearing only certain of the upper strips without so punching and shearing the lower strip, as hereinafter described. As illustrated, the bottom strip 5ª extends over the bottom die plate 72 and beneath the top die plate 71. The upper strip extends over the top die plate 71 and beneath a stripper plate 73. The two strips are separated and fed into their respective positions by a separator 74 shown in Fig. 10 and located between the feed rolls and die plates as shown in Figs. 1 and 2. This separator is supported by a pair of pins 75 at its ends and springs 76 on the pins normally hold the separator in engagement with the upper die plate. The purpose of these springs is to permit movement of the separator in the shearing operation hereinafter described. It will be seen that the bottom strip 5ª passes beneath the bottom plate 77 of the separator and the top strip passes over such plate. This plate is made somewhat V-shaped for the purpose of removing the ends of the separator as far from the feed rolls as possible, thereby avoiding interference with the feeding of the strips.

Each punch 67 as shown in Fig. 9 is normally held in raised position by a spring 78. A longitudinally movable latch plate 79 is provided for each row of ten punches 66 and a spring 80 normally draws each plate in a latching direction. The punches extend through slots in these plates and are provided with intermediate shouldered portions 81 for engaging beneath the plates. The arrangement is such that the depressing of a punch moves its plate longitudinally and when the punch is completely depressed the plate snaps back over the shoulder and holds the punch so depressed. A like latch plate 82 is provided for the row of three punches 67.

It will be seen that the movement of a latch plate caused by depressing any punch will automatically release any other set punch in that row. It may, however, occasionally be desired to restore all the set punches. The following means is provided for manually restoring all set punches, part of this mechanism also serving in the automatic restoring of the punches to normal position after each punching operation. A plate 83 (Fig. 15) slidably mounted beneath the latch plates 79, carries a crossbar 84 located just rearwardly of a downwardly extending lug 85 on each of latch plates 79 and 82. A non-punching key 86 extends through a slot 87 in the plate 83 and is provided with a beveled portion adapted to slide the plate forwardly when the key is depressed. A spring 88 normally holds the key raised. The arrangement is such that depressing of the key 86 moves the plate 83 and plates 79 and 82 forwardly in a manner releasing the set punches.

The following mechanism also cooperates with the plate 83 to automatically release the set punches after each punching operation. A lever 89 is pivoted to a vertical stud 58 and extends horizontally to a position rearwardly of the plate 83. A pawl 90 pivoted to the free end of the lever 89 is adapted to engage against the rear end of the plate 83, a leaf spring 91 normally holding the pawl in its raised position. A lever 92 pivoted at 93 to the lower die plate 72 extends upwardly through holes in the upper die plate and the bottom plate of the punch head to a position engaging against the rear of the lever 89. The beveled rear portion 94 of the lever 92 engages against a like beveled edge of the hole through the punch head bottom plate. A spring 95 normally forces the levers 89 and 92 rearwardly.

In Fig. 12 the punch head is shown in the raised position. When the punch head is depressed in the punching operation the cooperating beveled surfaces at 94 permit the levers 89 and 92 to pivot rearwardly, whereupon the pawl 90 snaps up behind the plate 83. When the punch head rises, after performing the punching operation, the beveled surfaces at 94 force the levers 89 and 92 forwardly in a manner moving the plate 83 and latch plates 79 and 82 forwardly to release the set punches. In the extreme forward position a tail 96 on the pawl 90 engages against a pin 97 in a manner pivoting the pawl downwardly and permitting the plate 83 and latch plates 79 and 82 to slide rearwardly to the punch latching position.

In Figs. 1 and 8 the machine is shown in the locked position wherein a pin 98 on the handle 30 is locked between a spring pawl 99 which prevents backward movement of the handle and a locking pin 100 which prevents forward movement of the handle. Means is provided for automatically moving the pin 100 out of this locking position when one of the classification punches 67 is set. The purpose of this interlock is to assure that the classification of the sale will be set up on the punch press before performing the punching operation.

The locking pin 100 is carried on one end of a lever 101 pivoted to the casing at 102, a spring 103 normally holding the lever and pin in the non-locking position, shown in Fig. 13. The other end of the lever is connected to a vertically movable post 104 having a hook 105 at its upper end to engage over the end of a sliding plate 106. A spring 107 normally holds this plate in the rearward position beneath the hook whereby the locking pin 100 is held in its handle locking position.

A sliding plate 108 has one end connected to the latch plate 82 and its other end in sliding engagement with the plate 106. An element 109 has the two opposite sides of its forward end respectively connected with the plates 83 and 108. A hook on the rear end of the element is adapted to engage in a notch in the side of plate 106 (Fig. 1). The arrangement is such that any movement of the plate 83 will not move the plate 106 nor release the hook 105. For example, depressing of the release button 86 moves the plate 83 forward. Such movement swings the rear end of the element 109 out of the notch in the plate 106 without having any effect on moving the plate 106 forwardly. However, the depressing of a classification punch 67 moves plates 82 and 108, element 109 and plate 106 forwardly as a unit, thereby releasing the hook 105. The spring 103 thereupon swings the lever 101 and its locking pin 100 out of the path of movement of the handle pin 98.

The punches 68 are best shown in Figs. 1, 6, 7 and 11. Each punch comprises a knurled head on one end and a punching portion at its other end. A recess 110 in each punch is adapted to be engaged by a locking plate 111 to lock the punches in place. This plate is mounted for a slight sliding movement in the head beneath the cover plate 112. A series of holes 113 is provided through the plate for receiving the punches. The plate is normally moved to and held in the punch locking position by a spring 114 within an opening in the center of the plate and engaging against the plate and against a lug 115 on the bottom surface of the cover 112. It will be seen that the spring normally holds the plate slid to a position engaging within the recesses 110 of the punches. The plate can be slid to the unlocking position to permit removing or changing the punches by passing a pointed instrument down through one of the punch holes.

The punches 69 are of ordinary round stock except for the knurled heads. A pocket 116 is provided for the date punches and a like pocket 117 is provided for the department and clerk punches. The construction of the punch mechanism in these pockets is the same. A punch receiving plate 118 is provided in each pocket and is normally held in the raised position by springs 119 on pins 120. When the punches are set in place through the proper holes a cover slide 121 is moved over the punches, this slide acting to hold the punches down in the punching position. It should be noted that these punches extend only far enough to perforate the strip or strips on the upper die plate only. The punches 68 extend sufficiently far to punch the strips on both die plates.

The knife 70 is carried by the punch head 57 in the manner shown in Figs. 11, 16 and 18. The knife is adapted to be slid into position in a recess 122 behind a plate 123 secured to the right hand edge of the punch head. The knife is held in cutting position therein by means of a pair of spring-pressed detents 124 and can be easily removed by depressing the detents by inserting an instrument thereagainst through holes 125 in the plate 123. These holes are preferably placed centrally within the knife whereby the knife can be reversed to cut with either edge.

The knife operates against the edge 126 of the upper die plate 71 to shear the strip thereon. The position of the knife and the movement of the head are such that the knife never reaches the strip on the lower die plate. Thus, the knife operates to shear only the strip or strips on the upper die plate, thereby leaving the tickets of the lowermost strip 5ª whole to pass into the compartment 4 in strip form.

Briefly the operation of the device is as follows: The supply pack 6 is placed in the compartment 3 by raising the cover 10 and platen 7 upwardly about their pivots. The ticket strips 5 are then passed beneath and over the carbon 14 and over the die plates 71 and 72 as shown. It is also assumed that the punches 68 and 69 have been set for the day.

Upon making a sale the clerk autographically records the necessary data on the ticket on the platen and totals the amount of the sale. He then depresses the punch buttons 66 corresponding to this total and also a button 67 to indicate the character of the sale; that is, cash, C. O. D. or charge. This depressing of a punch 67 releases the handle 30. The operator then performs the several operations of the machine by rotating this handle, the gearing herein illustrated being such that three rotations thereof are necessary.

Upon the first movement of the handle 30 the cams 56 operate through the levers 49 to draw the rollers 39 against the strips on the roller 37. The rollers 39 thereupon move the strips 5 sufficiently to be engaged by the rollers 38. Continued rotation of the handle then feeds the strips until the rollers 38 engage within the next holes 29. As illustrated in the drawing, this feeding movement locates both copies of the last autographed slip in the punching position between the punches and die plate, although it will be understood that only certain of the bottom copies (one or more) need be thus located if desired, the mechanism in that case being so arranged that the remaining copies may be torn off without being punched. This feeding of the paper takes approximately the first two rotations of the handle 30 and leaves the tickets in position for the next transaction as shown in Fig. 1. Continued rotation of the handle then operates to depress the punch head, thereby performing the punching operation and shearing the ticket resting on the upper die plate 71.

When the punch head raises, after performing the punching operation, the beveled surfaces at 94 (Fig. 14) force the levers 89 and 92 forwardly in a manner moving the plate 83 and latch plates 79 and 82 forwardly to automatically release the set punches. The sheared top copy 5, which projects beyond the punch head, as shown in Fig. 2, can then be removed and given to the customer or retained for future reference, according to the store practice used. The bottom strip 5ª is delivered into the compartment 4 as shown in Fig. 2, each punched ticket being delivered into such compartment at the next operation of the machine. This compartment has a removable cover provided with a lock whereby the tickets can be removed only by an authorized collector. It has been deemed unnecessary to herein disclose the specific details of this locked compartment, further than that disclosed in the right hand portion of Fig. 2, since the same may be of any desired construction and no particular novelty is claimed therefor. Such a locked compartment is more specifically shown in a similar machine in my Patent No. 1,669,766, dated May 15, 1928.

I claim:

1. A sales record machine comprising the combination of a body, a writing platen thereon, a punch press on the body laterally adjacent the platen and including a plurality of punches and a cooperating die plate, cooperating means for setting up a predetermined punching condition comprising varying combinations of the punches to punch varying desired definite sums and other related data, the machine in operation being adapted to support a plurality of strips of tickets in manifolded relation extending over the platen and certain thereof between the punches and die, the arrangement being such that the operator can autographically record a sales transaction on the ticket on the platen and then set up the said punching condition to correspond to such sale and thereafter compare such setting with the autographed record on the platen before performing the punching operation, means for causing a definite relative predetermined movement of the said strips and punch press whereby one or more copies of the said autographed ticket are located in the punching position, means for thereafter operating the punch press to punch the same in a manner corresponding to the said punching condition, and a unitary element for operating the last two said means in timed relation.

2. A sales record machine comprising the combination of a body, a writing platen thereon, a punch press on the body laterally adjacent the platen and including a plurality of punches and a cooperating die plate, cooperating means for setting up a predetermined punching condition comprising varying combinations of the punches to punch varying desired definite sums and other related data, the machine in operation being adapted to support a plurality of strips of tickets in manifolded relation extending over the platen and certain thereof between the punches and die, the arrangement being such that the operator can autographically record a sales transaction on the ticket on the platen and then set up the said punching condition to correspond to such sale and thereafter compare such setting with the autographed record on the platen before performing the punching operation, means for causing a definite relative predetermined movement of the said strips and punch press whereby one or more copies of the said autographed ticket are located in the punching position, means for thereafter operating the punch press to punch the same in a manner corresponding to the said punching condition, a knife for shearing certain of the said autographed tickets from the strips, and a unitary element for operating the last said means and knife in timed relation.

3. A sales record machine comprising the combination of a body, a writing platen thereon, a punch press on the body laterally adjacent the platen and including a plurality of punches and a cooperating die plate, cooperating means for setting up a predetermined punching condition comprising varying combinations of the punches to punch varying desired definite sums and other related data, the machine in operation being adapted to support a plurality of strips of tickets in manifolded relation extending over the platen and certain thereof between the punches and die, the arrangement being such that the operator can autographically record a sales transaction on the ticket on the platen and then set up the said punching condition to correspond to such sale and thereafter compare such setting with the autographed record on the platen before performing the punching operation, means for causing a definite relative predetermined movement of the said strips and punch press whereby one or more copies of the said autographed ticket are located in the punching position, means for thereafter operating the punch press to punch the same in a manner corresponding to the said punching condition, a knife for shearing certain of the said autographed tickets from the strips, and a unitary element for operating the last two said means and knife in timed relation.

4. A sales record machine comprising the combination of a body, a writing platen thereon, a punch press on the body laterally adjacent the platen and including a plurality of punches and two relatively spaced die plates cooperating with the punches, cooperating means for setting up a predetermined punching condition comprising varying combinations of the punches to punch varying desired definite sums and other related data, the machine in operation being adapted to support a plurality of sales strips in manifolded relation with certain thereof extending over one die plate and certain over the other die plate all beneath the punches, the arrangement being such that the operator can autographically record a sales transaction on the sales slip on the platen and then set up the said punching condition to correspond thereto, means for feeding the strips into the punch press in such manner that the autographed slips thereof are located in the punching position, and means for thereafter operating the punch press to punch the same in a manner corresponding to the said punching condition, the said two die plates permitting the punching of all the strips thereon or only those on the plate nearer the punches.

5. A sales record machine comprising the combination of a body, a writing platen thereon, a punch press on the body laterally adjacent the platen and including a plurality of punches and two relatively spaced die plates cooperating with the punches, cooperating means for setting up a predetermined punching condition comprising varying combinations of the punches to punch varying desired definite sums and other related data, the machine in operation being adapted to support a plurality of sales strips in manifolded relation with certain thereof extending over one die plate and certain over the other die plate all beneath the punches, the arrangement being such that the operator can autographically record a sales transaction on the sales slip on the platen and then set up the said punching condition to correspond thereto, means for feeding the strips into the punch press in such manner that the autographed slips thereof are located in the punching position, means for thereafter operating the punch press to punch the same in a manner corresponding to the said punching condition, and a knife operating in conjunction with the upper die plate to shear the end tickets from the strips thereon.

6. A sales record machine comprising the combination of a body, a writing platen thereon, a punch press on the body laterally adjacent the platen and including a plurality of punches and two relatively spaced die plates cooperating with the punches, cooperating means for setting up a predetermined punching condition comprising varying combinations of the punches to punch varying desired definite sums and other related data, the machine in operation being adapted to support a plurality of sales strips in manifolded relation with certain thereof extending over one die plate and certain over the other die plate all beneath the punches, the arrangement being such that the operator can autographically record a sales transaction on the sales slip on the platen and then set up the said punching condition to correspond thereto, means for feeding the strips into the punch press in such manner that the autographed slips thereof are located in the punching position, means for thereafter operating the punch press to punch the same in a manner corresponding to the said punching condition, and a separator between the feeding means and die plates whereby certain of the strips fed are directed onto one die plate and certain onto the other die plate.

7. A sales record machine comprising the combination of a body, a writing platen thereon, a punch press on the body laterally adjacent the platen and including a plurality of punches and cooperating die means, cooperating means for setting up a predetermined punching condition comprising varying combinations of the punches to punch varying desired definite sums and other related data, the machine in operation being adapted to support a plurality of strips of tickets in manifolded relation extending over the platen and certain thereof between the punches and die means, the arrangement being such that the operator can autographically record a sales transaction on the ticket on the platen and then set up the said punching condition to correspond thereto, means for causing a definite relative predetermined movement of the said strips and punch press whereby one or more copies of the said autographed ticket are located in the punching position, means for thereafter operating the punch press to punch the same in a manner corresponding to the said punching condition, and means including a knife operative to shear the end tickets from certain only of the said strips.

8. A sales record machine comprising the combination of a body, a writing platen thereon, a punch press on the body laterally adjacent the platen and including a plurality of punches and cooperating die means, cooperating means for setting up a predetermined punching condition comprising varying combinations of the punches to punch varying desired definite sums and other related data, the machine in operation being adapted to support a plurality of strips of tickets in manifolded relation extending over the platen and certain thereof between the punches and die means, the arrangement being such that the operator can autographically record a sales transaction on the ticket on the platen and then set up the said punching condition to correspond thereto, means for causing a definite relative predetermined movement of the said strips and punch press whereby one or more copies of the said autographed ticket are located in the punching position, means for thereafter operating the punch press to punch the same in a manner corresponding to the said punching condition, means for supporting a carbon strip between the sales strips on the platen, and means automatically operated by the punch press for giving the carbon strip a feeding movement at each punching operation.

9. A sales record machine comprising the combination of a body, a writing platen thereon, a punch press on the body laterally adjacent the platen and including a plurality of punches and cooperating die means, cooperating means for setting up a predetermined punching condition comprising varying combinations of the punches to punch varying desired definite sums and a classification therefor, the machine in operation being adapted to support a plurality of strips of tickets in manifolded relation extending over the platen and certain thereof between the punches and die means, the arrangement being such that the operator can autographically record a sales transaction on the ticket on the platen and then set up the said punching condition to correspond thereto, means for causing a definite relative predetermined movement of the said strips and punch press whereby one or more copies of the said autographed ticket are located in the punching position, means for thereafter operating the punch press to punch the same in a manner corresponding to the said punching condition, and interlocking means preventing the said punching operation until the said classification punching condition has been set up.

10. A sale record machine comprising the combination of a body, a writing platen thereon, a punch press on the body laterally adjacent the platen and including a plurality of punches and cooperating die means, cooperating means for setting up a predetermined punching condition comprising varying combinations of the punches to punch varying desired definite sums and other related data, the machine in operation being adapted to support a plurality of sales strips in manifolded relation extending over the platen and certain thereof between the punches and die means, the arrangement being such that the operator can autographically record a sales transaction on the sales slip on the platen and then set up the said punching condition to correspond thereto, means for feeding the strips into the punch press in such manner that the autographed slips thereof are located in the punching position between the punches and die means, means for thereafter operating the punch press to punch the same in a manner corresponding to the said punching condition, and interlocking means preventing operation of the feeding means until the punching condition relating to certain of the said data has been set up.

11. A sales record machine comprising the combination of a body, a writing platen thereon, a punch press on the body laterally adjacent the platen and including a plurality of punches and cooperating die means, cooperating means for setting up a predetermined punching condition comprising varying combinations of the punches to punch varying desired definite sums and other related data, the machine in operation being adapted to support a plurality of sales strips in manifolded relation extending over the platen and certain thereof between the punches and die means, the arrangement being such that the operator can autographically record a sales transaction on the sales slip on the platen and then set up the said punching condition to correspond thereto, means for feeding the strips into the punch press in such manner that the autographed slips thereof are located in the punching position between the punches and die means, means for thereafter operating the punch press to punch the same in a manner corresponding to the said punching condition, a unitary means for operating the feeding and punching means, and interlocking means preventing operation of the said unitary means until the punching condition relating to certain of the said data has been set up.

12. A sales record machine comprising the combination of a body, a writing platen thereon, a punch press on the body laterally adjacent the platen and including a plurality of punches and cooperating die means, cooperating means for setting up a predetermined punching condition comprising varying combinations of the punches to punch varying desired definite sums and other related data, the machine in operation being adapted to support a plurality of strips of tickets in manifolded relation extending over the platen and certain thereof between the punches and die means, the arrangement being such that the operator can autographically record a sales transaction on the ticket on the platen and then set up the said punching condition to correspond thereto, means for causing a definite relative predetermined movement of the said strips and punch press whereby one or more copies of the said autographed ticket are located in the punching position, means for thereafter causing a relative approaching movement between the punches and die means to punch the same in a manner corresponding to the said punching condition, and means automatically restoring the punching mechanism from the said set-up condition to normal condition after completion of the punching operation.

13. A sales record machine comprising the combination of a body, a writing platen thereon, a punch press on the body laterally adjacent the platen and including a plurality of punches and cooperating die means, cooperating means for setting up a predetermined punching condition comprising varying combinations of the punches to punch varying desired definite sums and a classification therefor, the machine in operation being adapted to support a plurality of strips of tickets in manifolded relation extending over the platen and certain thereof between the punches and die means, the arrangement being such that the operator can autographically record a sales transaction on the ticket on the platen and then set up the said punching condition to correspond thereto, means for causing a definite relative predetermined movement of the said strips and punch press whereby one or more copies of the said autographed ticket are located in the punching position, means for thereafter operating the punch press to punch the same in a manner corresponding to the said punching condition, interlocking means preventing the said punching operation until the said classification punching condition has been set up, and means automatically restoring the punching mechanism from the said set-up condition to normal condition after the punching operation.

14. In a punch press the combination of a plurality of punches and a cooperating die plate, means including a pair of relatively narrow friction rollers for engaging a strip and feeding the same into punching position between the punches and die plate, the strip having two rows of relatively spaced holes therein in alignment with the said rollers whereby the strip feed stops when the rollers enter such holes, means operative to thereafter cause a relative punching movement between the punches and die plate, and means operated in timed relation with the last mentioned means for starting the strip feed after each punching operation.

15. In a punch press, the combination of a plurality of punches and a cooperating die plate, means including a pair of relatively narrow friction rollers for engaging the strip and feeding the same into punching position between the punches and die plate, the strip having two rows of relatively spaced holes therein in alignment with the said rollers whereby the strip feed stops when the rollers enter such holes, a shaft connected to the first mentioned means, means operated by the shaft for causing a relative punching movement between the punches and die plate and means also operated by the shaft to start the strip feed after each punching operation.

In testimony whereof I affix my signature.

LEONARD W. LANGFORD.